(12) United States Patent
Seelhofer et al.

(10) Patent No.: US 6,547,105 B1
(45) Date of Patent: Apr. 15, 2003

(54) PLASTIC CONTAINER AND CORRESPONDING METERING ELEMENT WITH A CLOSURE

(75) Inventors: Fritz Seelhofer, Lindau (CH); Fernando Suarez, Zürich (CH)

(73) Assignee: Createchnic AG, Nürensdorf (CH)

( * ) Notice: Subject to any disclaimer, the term of this patent is extended or adjusted under 35 U.S.C. 154(b) by 0 days.

(21) Appl. No.: 09/936,378

(22) PCT Filed: Mar. 10, 2000

(86) PCT No.: PCT/EP00/02131

§ 371 (c)(1),
(2), (4) Date: Jan. 15, 2002

(87) PCT Pub. No.: WO00/55071

PCT Pub. Date: Sep. 21, 2000

(30) Foreign Application Priority Data

Mar. 12, 1999 (EP) .............................. 99810225

(51) Int. Cl.⁷ .................................................. B67D 5/06
(52) U.S. Cl. ....................... 222/205; 222/211; 222/212; 222/449
(58) Field of Search ................................ 222/205, 211, 222/212, 444, 449

(56) References Cited

U.S. PATENT DOCUMENTS

| 4,210,263 | A | * | 7/1980 | Bos .............................. 222/449 |
| 5,133,479 | A | * | 7/1992 | Boyte, Sr. ....................... 222/1 |
| 5,224,632 | A | * | 7/1993 | Marakami et al. ........... 222/205 |
| 5,381,930 | A | * | 1/1995 | Kalabakas ................... 222/205 |
| 6,330,960 | B1 | * | 12/2001 | Faughey et al. ............. 222/205 |

* cited by examiner

Primary Examiner—Joseph A. Kaufman
(74) Attorney, Agent, or Firm—Pauley Peterson Kinne & Erickson

(57) ABSTRACT

A plastic container having a storage chamber which graduates from a shoulder section into a bottle neck, in such a way that the length of the bottle neck can be changed about its axis. Thus, this invention provides a constriction between the shoulder section and a pour-out area. The constriction is adjacent the shoulder section and is followed by an area which can be axially compressed. The constriction can serve as a sealing area. Liquid, free-flowing and pourable media can be discharged in doses using a metering element which is fixed to the top of the bottle neck and which penetrates the constriction. By exerting pressure on the metering element, it is possible to establish an open or closed connection between the metering element and the storage chamber of the plastic container.

9 Claims, 11 Drawing Sheets

PLASTIC CONTAINER AND CORRESPONDING METERING ELEMENT WITH A CLOSURE

BACKGROUND OF THE INVENTION

1. Field of the Invention

This invention relates to a plastic container which is suitable for use with a metering element, and to a metering element with a closure for metered dispensing of liquid, free-flowing and pourable media.

2. Description of Related Art

Normally a plastic container represents a storage space and the metering element has a metering chamber. The exit of the medium is effected from the storage space to the outside via the metering chamber.

Such devices often known as metering systems are in varied embodiment forms. While the storage space practically with all solutions is a plastic bottle, the formation of the metering chamber is completely different. In the simplest form the metering chamber is a separate cuplet pushed over the closure which closes the storage space. This solution is simple in manufacture, can be understood and is relatively inexpensive in manufacture. However the handling is problematic. If for example the storage space is relatively large and the cuplet which serves as a metering chamber is small, then material is often spilled. Often the cuplet is not completely filled so that an under-metering takes place.

If the medium to be metered is a washing agent, then the consequences are not particularly relevant, but if it is a medicament, for example a cough syrup, then this is much more unpleasant. A further problem with such metering chambers which are formed as metering cuplets is that after use the dirtied cuplet must first be washed out, otherwise there is a complete dirtying of the closure and of the container.

For these reasons in various systems the metering chamber forms part of a complex closure system. With various movable parts a fixed quantity of a flowable medium first may flow into the chamber. The chamber in an active movement is closed with respect to the storage space, and the metered quantity may flow out of the metering chamber to the outside or may be delivered to the outside. This depends on whether the metering system functions with the piston principle or not. Both are known in various embodiment forms.

Such metering systems are mostly complex and are accordingly expensive, which is why they have only prevailed where the medium to be metered is relatively expensive. Such systems in particular with medicaments are known. Also with the metering of various fine chemicals or adhesives such systems are considered, in particular when an air exchange to the outside is to be avoided.

Finally there are also known metering systems with which the plastic container has a storage space and a connected metering chamber. Such systems are known with fluids, wherein the metering chamber represents a siphon space. The metering is accomplished by allowing fluid flow into the siphon space and afterwards emptying the siphon space. With all these siphon systems the metering is not completely and correctly solved, in particular because in a deformable plastic container, wherein there is an undesired pressure on the plastic container when emptying the metering container, medium may flow from the storage space into the storage space so that an increased dosage is delivered.

Also, when using this system practically only the metering of fluids is possible. The dispensing of free-flowing and pourable media may hardly be realized by way of siphon systems. This is hardly possible with systems with which the metering is effected by way of piston cylinder units. It is one object of this invention to provide a plastic container particularly suitable for use with metering elements or other means which demand an active movement of means relative to the storage space of the plastic container.

SUMMARY OF THE INVENTION

This object is achieved by a plastic container described in this specification and in the claims. Because of possible axial relative movement, according to this invention, of the container edge to the storage space of the plastic container, there is a movement component which considerably simplifies the formation of an active movement element, such as a pump or metering element.

It is a further object of this invention to provide a metering element which provides an inexpensive and simply manufacturable metering system which is suitable for liquid as well as free-flowing or pourable media.

This object is achieved with a metering element with a closure, which is particularly simple since it does not have any active-moving elements. The active movement is assumed for example by a plastic container. Unusually for the metering capability, the closure is actively involved in the functioning.

Further advantageous embodiment forms of this invention are deduced from the dependent claims and are explained in the subsequent description with regard to the functioning and significance.

BRIEF DESCRIPTION OF THE DRAWINGS

The drawings show two embodiment forms of this invention which are described by the subsequent description, wherein.

DESCRIPTION OF PREFERRED EMBODIMENTS

Figure 1:
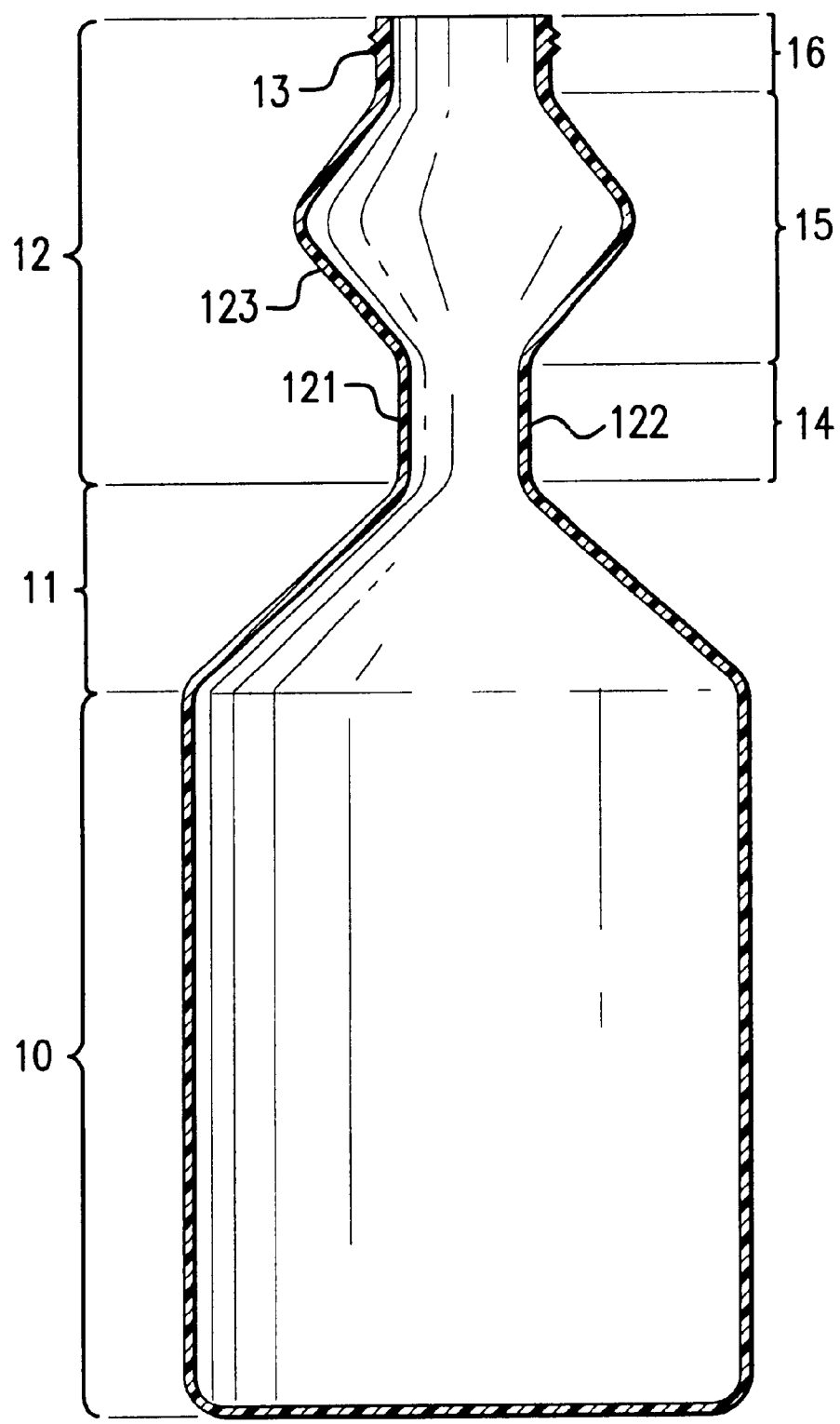
FIG. 1 is a plastic container alone in a vertical section.

FIG. 1 shows a plastic container according to this invention in a vertical centric section. The plastic container is indicated in its entirety as element 1. It comprises a storage space 10 connected to a shoulder section 11 which merges into the container neck 12. The container neck 12 comprises fastening means 13 suitable for fastening a closure or a metering element. In the case shown the fastening means is an outer thread. Other fastening means include, for example, a retaining cam or retaining bulge, both means with which a closure or a metering element may be knocked on or pressed on. Other fastening means are known to those skilled in the art and may also be considered.

The container neck 12 has three regions which are named according to function. Directly connected to the shoulder section 11 there is a constriction 121 as a sealing region 14. The sealing region 14 may in the axial extension be formed differently long and thus form a guide region 122. As later described the guide region may also be formed by a separate guide element.

Following the sealing region 14 in the pour-out direction is an axially compressible region 15 which is formed of one or more annular folds 123 arranged behind one another in the axial direction. This axially compressible region 15 may be shortened in its axial extension by pressure above on the container neck 12. By way of the intrinsic elasticity the compressible region 15 again assumes its initial position as soon as the pressure in the axial direction is lifted. Should the intrinsic elasticity not be sufficient then additionally in the compressible region 15 there may be arranged a compression spring, not shown. This may be avoided by changing the restoring force alone by increasing the wall thickness of the annular folds in certain regions. This technique is known to those skilled in the art of plastic processing, particularly in the manufacture of spring bellows.

Finally, following the axially deformable region 15 is the pour-out region 16 on which the already mentioned fastening means 13, here the outer thread, is arranged or formed.

As later described, such a plastic container may be applied in a diverse manner. The subsequent embodiment forms of this invention as described are in no way conclusive.

The plastic container according to this invention may also be used as a simple bottle without the axially compressible region. The constriction 121 would then merely serve as a holding region.

Figure 2:
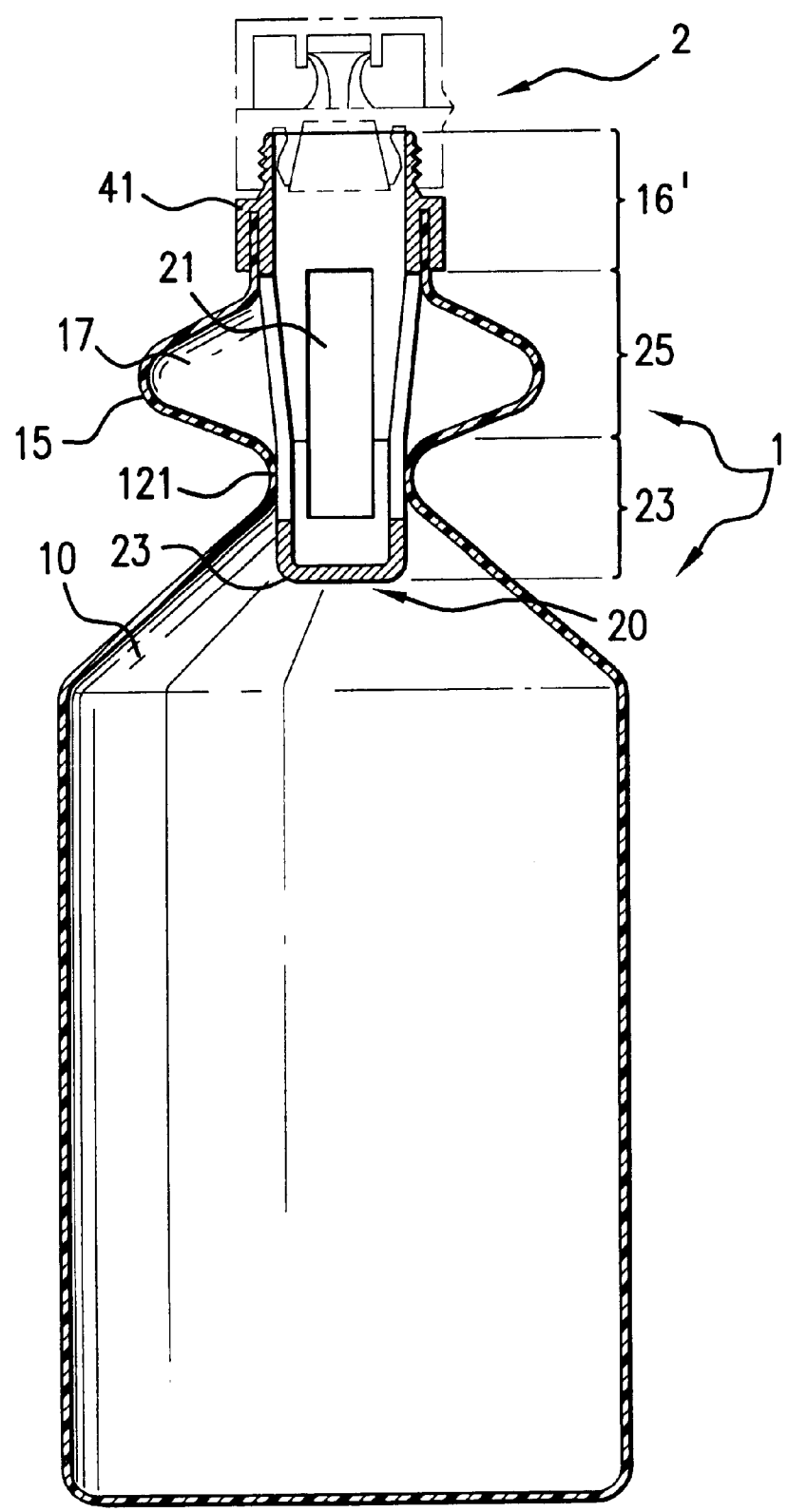
FIG. 2 is a plastic container with a closure according to this invention, in a vertical section in the metering position.

FIG. 2 shows a first embodiment of a metering element according to this invention in use with a plastic container of the previously described type, in a vertical section. Again in its entirety the plastic container is indicated as element 1. In the embodiment shown the plastic container 1 is manufactured of one piece, in particular as a blown bottle. This blown bottle has two recognizable spaces, specifically a storage space 10 and the axially compressible region 15. In the pour-out direction the compressible region 15 is connected after the storage space 10. In principle it is possible to manufacture the storage space 10 as a blown receptacle, while the compressible region 15 may be manufactured separately with the pour-out region 16, for example as an injection molded element. The compressible region 15 may then be connected to the storage space 10 in the most varied of manners. This may be done purely mechanically as well as also by way of welding or adhering. The connection is effected in the region of the constriction 121. In particular when the connection of the two parts is a screw connection, it may be useful in the region of the restriction 121 to design the connection simultaneously as the guide region 122. But also for welding or adhering the guide region 122 may be used. In the case of a mechanical coupling of the storage space 10 and the compressible region 15 the guide element 122 may be two-part, for example as concentric, annular parts which may be screwed to one another.

On the container neck 12 there is fastened a metering element 20 fixed in a positionally fixed manner. This metering element 20 passes through the axially compressible region 15 completely and reaches up to into the region of the constriction 121. Effectively even the lower end of the metering element 20 projects at least a little further through the constriction 121 into the storage space 10. The peg-like metering element 20 comprises a closed base 23 and forms in the relaxed condition of the axially compressible region 15 a closing peg which lies in the constriction 121 as a cork. The peg-like metering element 20 comprises a cylindrical section 24 connecting on the closed base 23 and then merges into a conical section 25 which bears directly on the pour-out region 16 of the bottle neck or, as is shown here, merges into a pour-out region 16'. The peg-like metering element 20 comprises several longitudinal openings 21 in the lateral walls, which extend from the lower cylindrical section over the subsequent conical section 25 upwards into the region near to the bottle pour-out 16. Just at the top the peg-like metering element 20 is completely open and forms either directly the pour-out or communicates with a pour-out which forms part of a closure placed on the bottle neck 12.

Figure 3:
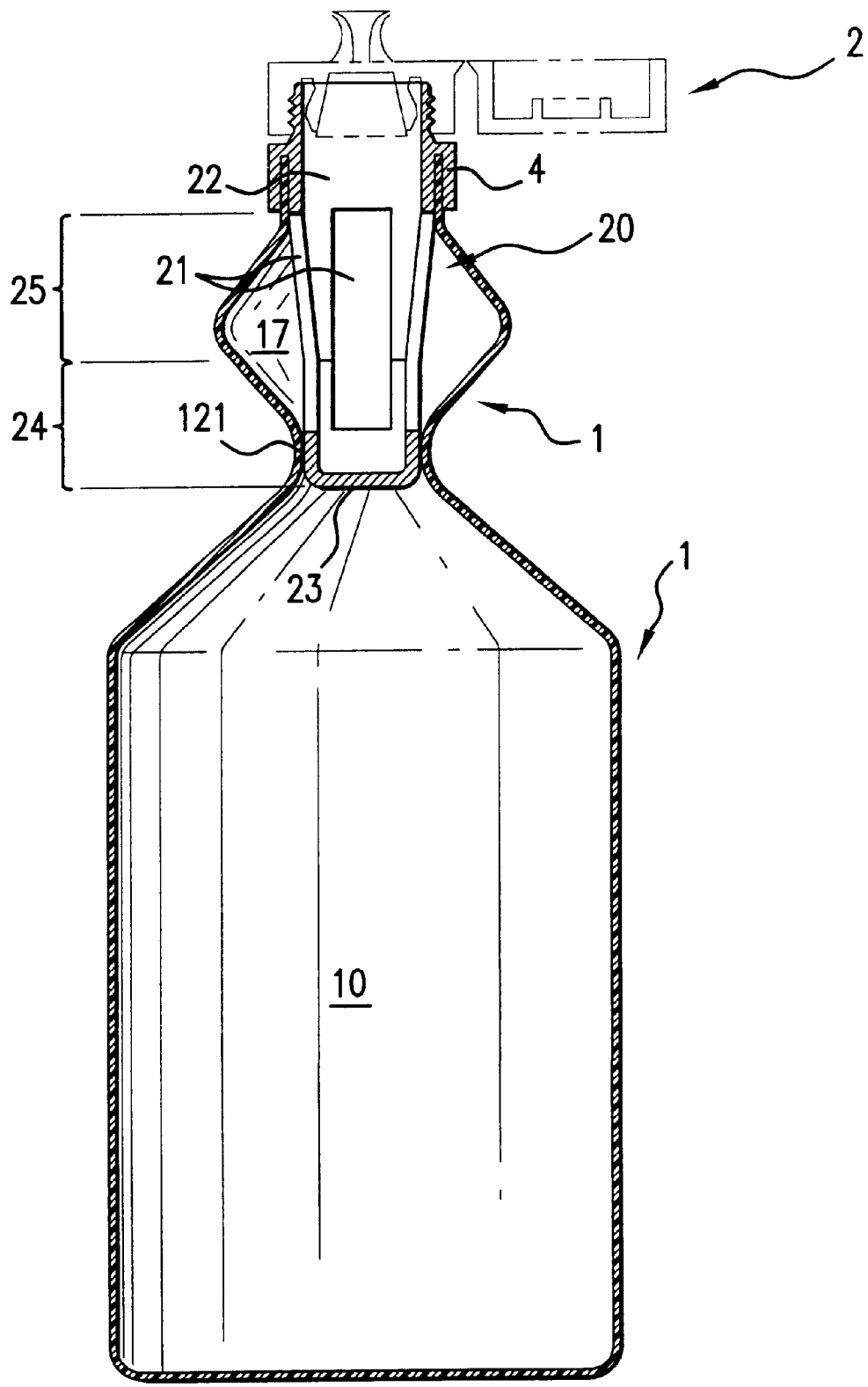
FIG. 3 shows the plastic container in the dispensing position, in a vertical section, in which the metering space is emptied.

FIG. 3 shows a plastic container according to this invention with a metering element 20 according to this invention with a closure, in the dispensing position. The closure 2, which is shown dashed as a snap hinge closure having a lower part and of a cap which is hingedly connected thereto, is in this position open. By turning the container 1 around the entire contents of the metering element 20 goes through the lateral openings 21 and the pour-out opening 22 out of the space 17 which is enclosed by the axially compressible region 15, and directly or via the closure 2 passes to the outside. In this position the bellows-like variable space 17 is completely relaxed. The lower region of the metering element 20 with its closed base 23 lies in the region of the constriction 121 and thus seals the passage from the storage space 10 into the variable space 17. If the metering element 20 and the variable space 17 is emptied one closes the closure 2. With the closure closed one may press onto this, by which means the bellows-like, axially compressible region 15 is shortened in the axial direction. Because the peg-like metering element 20 is connected to the bottle neck region by way of the axial shortening of the compressible region 15 the peg-like metering element 20 with its lower part is pushed into the storage space 10. With this the lateral openings 21 come into the storage space 10 in a communicating manner so that through the lateral openings 21 medium may flow out of the storage space 10 through the lateral openings 21 into the peg-like metering element 20 and from this to the outside into the variable space 17. If the metering element and the space 17 is filled, one removes the pressure on the closure, the compressible region 15 is relaxed again and with this in turn pulls the peg-like metering element 20 upwards so that again the lower closed region 23 lies in the constriction. With this the communicating connection between the storage container 10 and the variable space 17 is interrupted. This solution is suitable also for containers which are stored hanging on their heads. Only when one exerts a pressure on the bottle neck from below can the storage space 10 come into communicating connection with the variable space 17. As long as the closure is open one would not want to press this upwards.

Figure 4:
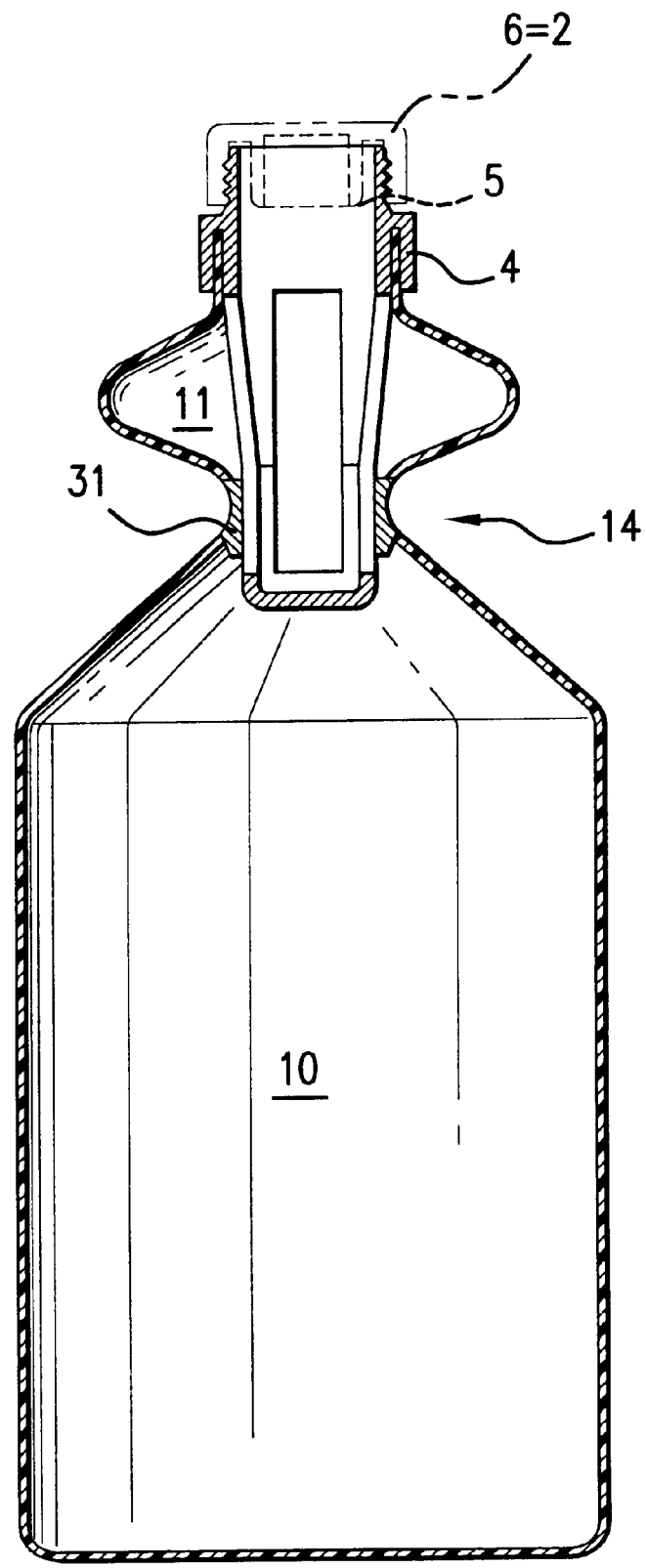
FIG. 4 is a vertical section showing the metering position in which the metering space is filled.

With the previously shown embodiments, the peg-like metering element 20 has a collar 4. To the collar 4 is connected a pour-out part 5 with an outer thread and there is placed on a hinge closure 2. In FIG. 4, in contrast, instead of the hinge closure there is shown dashed a rotary closure 6.

Figure 5:
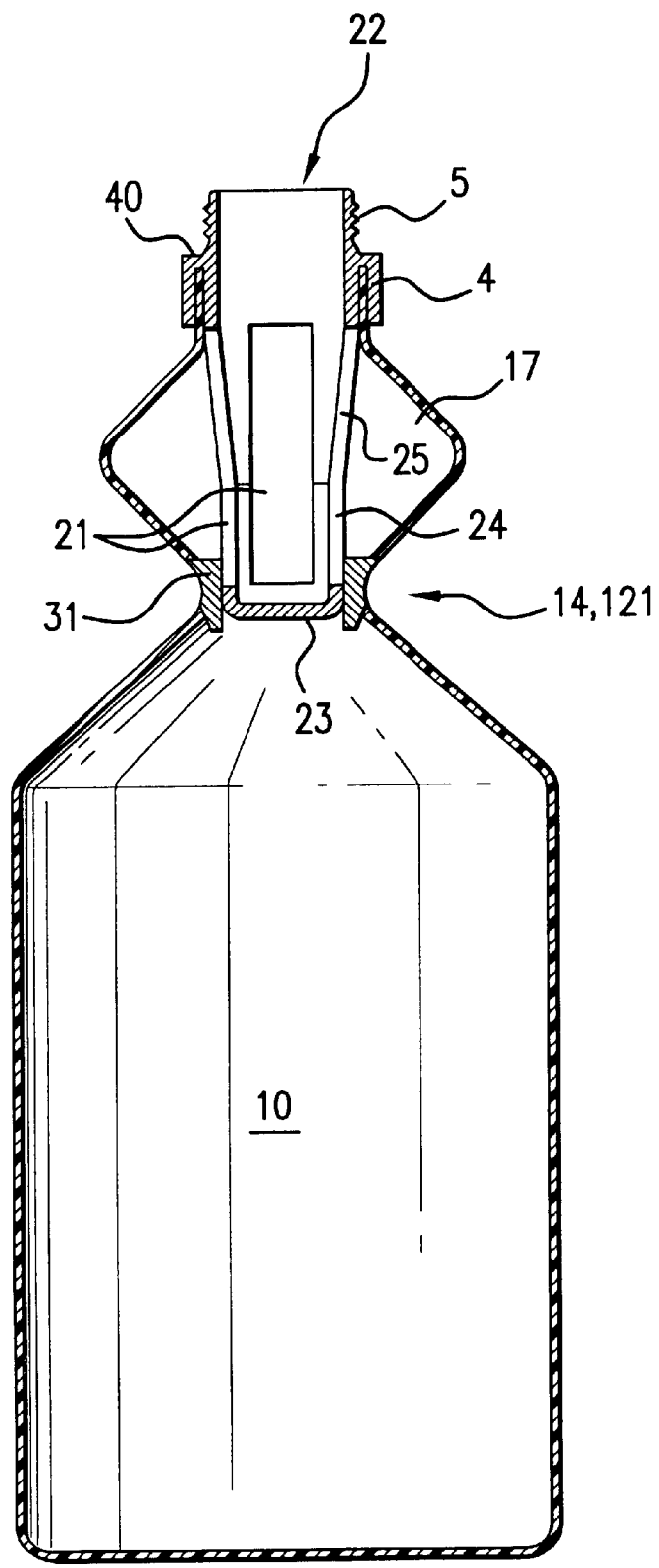
FIG. 5 is a vertical section showing the position in which the metering space is emptied.

In the same FIGS. 4 or 5 also the sealing region 14 is formed with a separate part as a guide part 31. The guide part 31 with a two-part container 1 may be added during assembly. With a one-part container this demands the width of the pour-out region 16 to be shaped so large that the part may be introduced from above and pressed into the correct position.

The pour-out of the metering element 20 is indicated as element reference numeral 22 and may be formed in any manner with regard to shaping.

Figure 6:
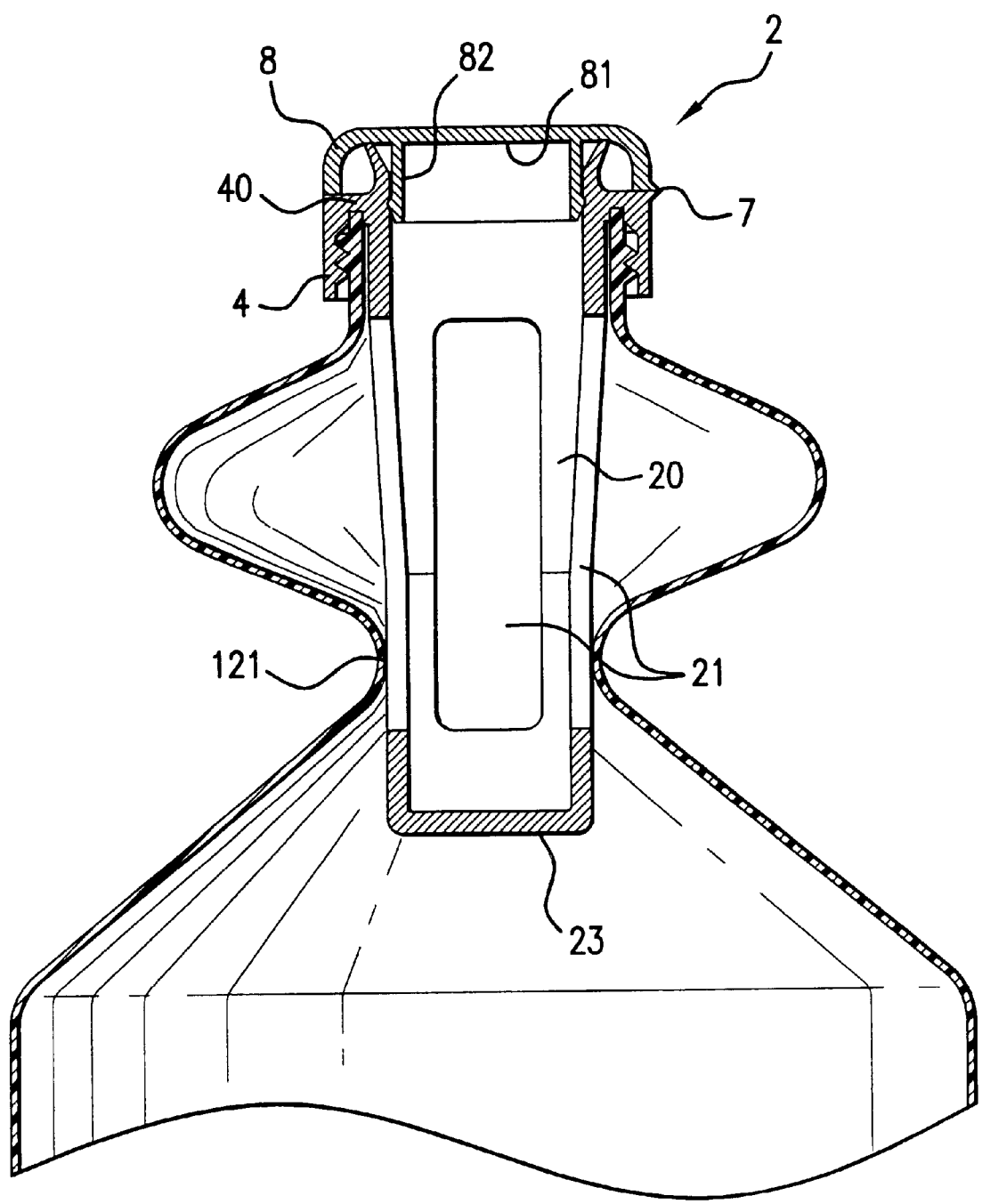
FIG. 6 shows one embodiment of a metering element having a closure as one piece, in the metering position.
Figure 7:
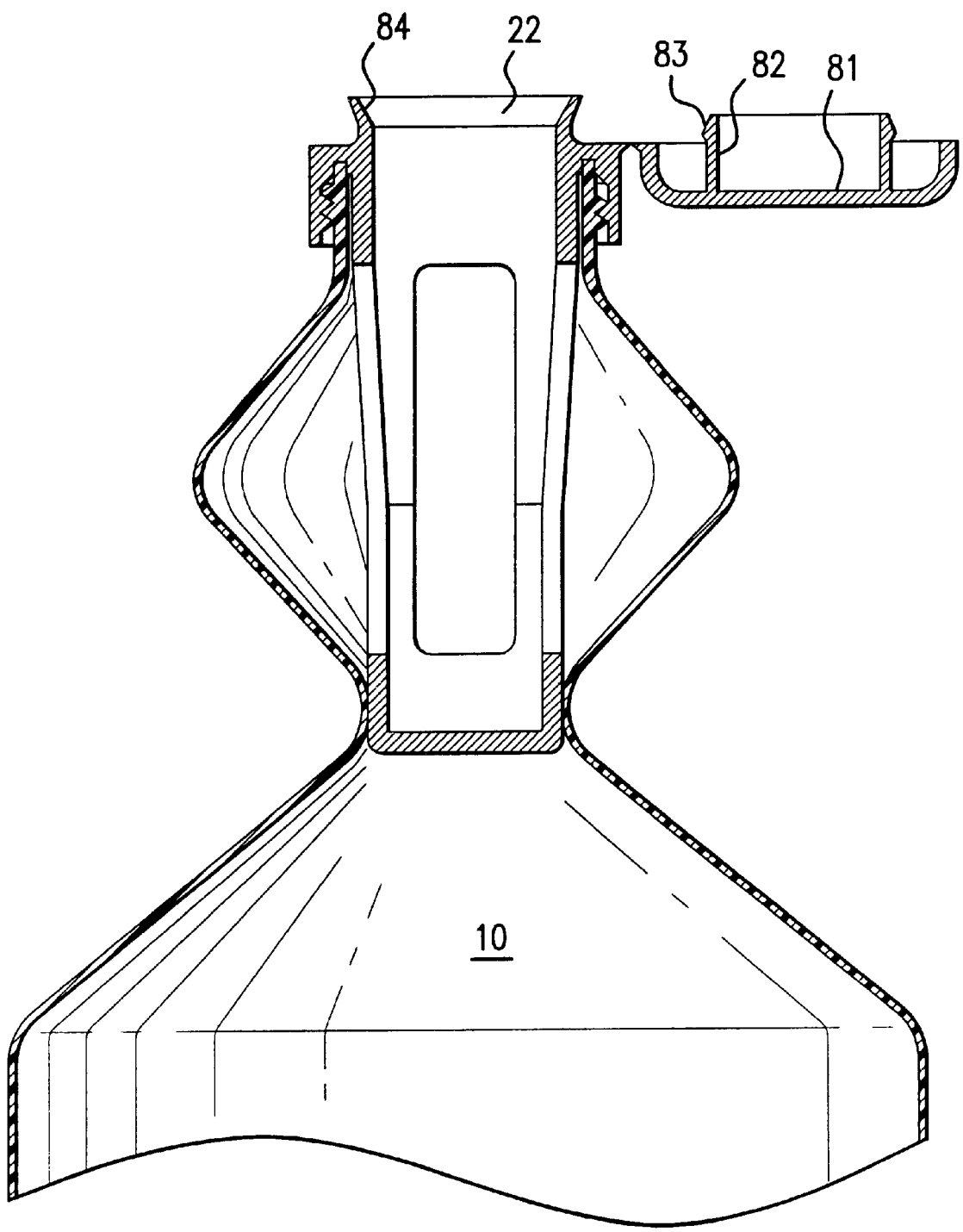
FIG. 7 shows the metering element of FIG. 6 but in the dispensing position.

FIGS. 6 and 7 show that the metering element 20 also simultaneously may be part of a hinge closure 2. The circumferential collar 4 is via a circumferential web 40 connected to the metering element 20. Via the film hinge 7 there is formed on a pivotable cap 8. The cap 8 has on the inner surface 81 a sealing peg 82 which projects into the pour-out 22 and seals this from the inside. For this the sealing peg 82 has a sealing bulge 83. The pour-out 22 has a pour-out lip 84.

Figure 8:
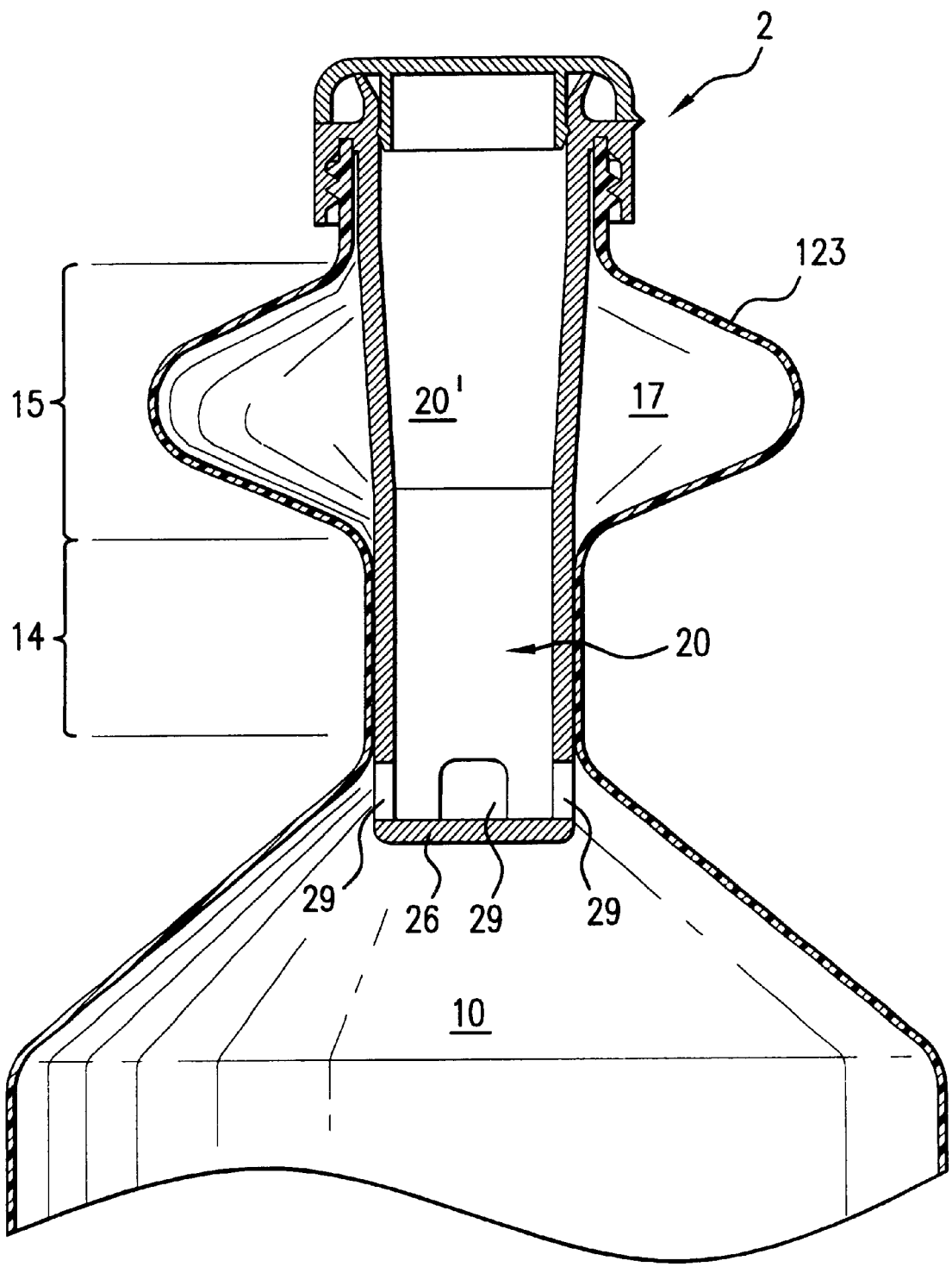
FIG. 8 shows an embodiment with a metering element which is particularly suitable for free-flowing and pourable media, again in the metering position.
Figure 9:
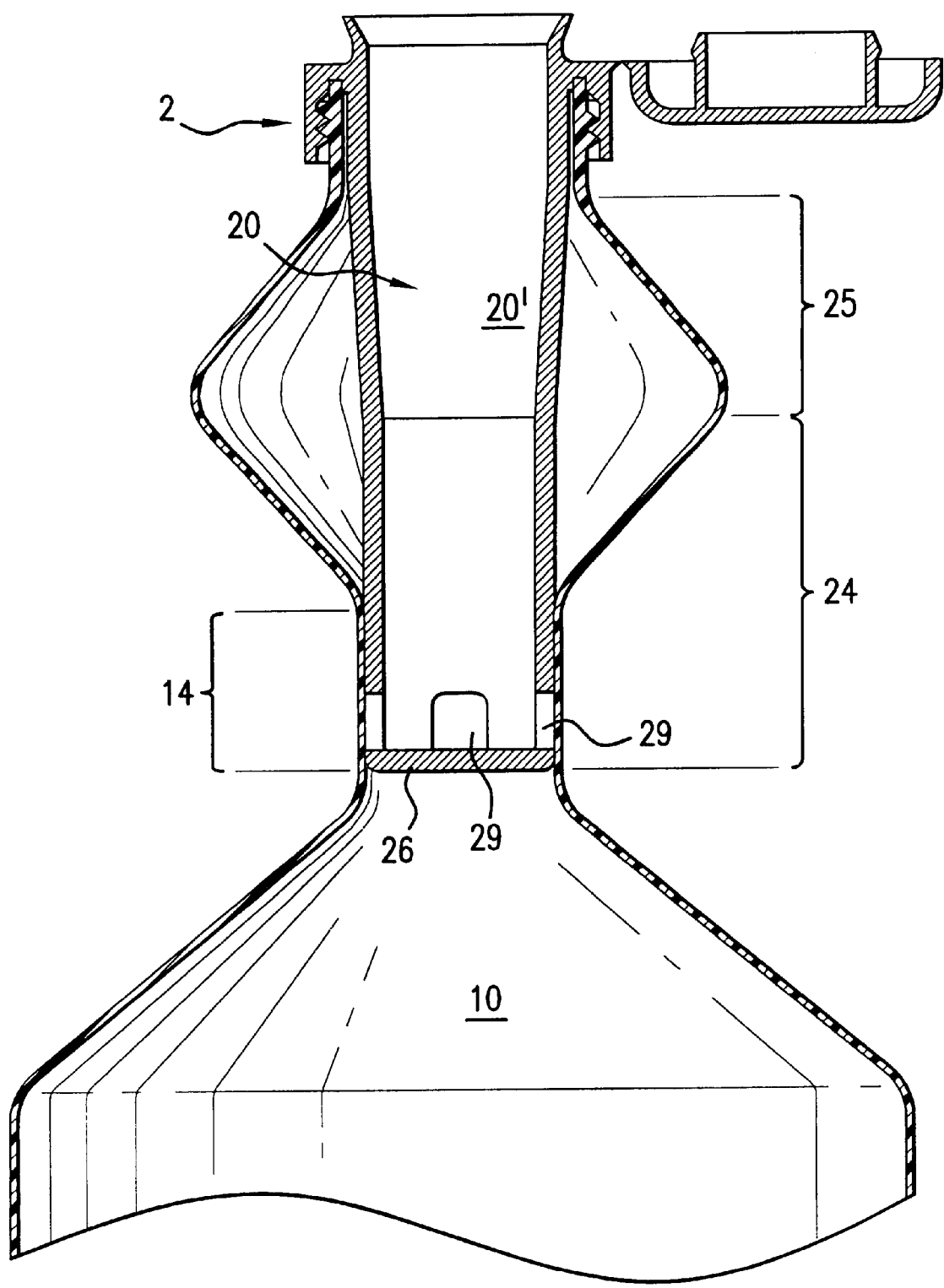
FIG. 9 shows the metering element of FIG. 8 but in the dispensing position.

One formation of the metering element 20 is shown in detail in the FIGS. 8 and 9. The plastic container 1 corresponds again to the formation according to FIG. 1. The lengthened sealing region 14 and the axially compressible region 15 are clearly recognizable. The metering element has only in the region near to the base 23 a communicating opening 29 extending in the axial direction only a little upwards. The openings 29 in the position according to FIG. 8, the so-called metering position, are in communicating connection with the storage space 10 of the plastic container 1. The medium present in the storage space may thus flow into the peg-like metering element 20 and fill up the entire hollow space 20'. It may however, in contrast to the previously described embodiments, not get into the variable space 17. The annular fold thus only has the function of spring-loading and permits the axial displacement of the metering element 20 and its guiding back into the initial position. In particular, with the metering of free-flowing and pourable media, such as for example washing powder, such a metering is advantageous. If no washing powder gets into the variable space then the medium may also not agglomerate, by which means the whole function of the system would be inhibited.

In the metering position with a closed closure the entire hollow space 20' is filled. For this it is useful to manufacture the plastic container as well as the metering element 20 out of transparent plastic. If the metering element 20 is full, one removes the pressure on the closure, the openings come to lie in the sealing region 14 and one may open the closure or the lid 8. Now the free-flowing or pourable medium may be emptied straight out of a measuring cuplet.

Also the sealing region 14 may be realized with a guide part 31.

Figure 10:
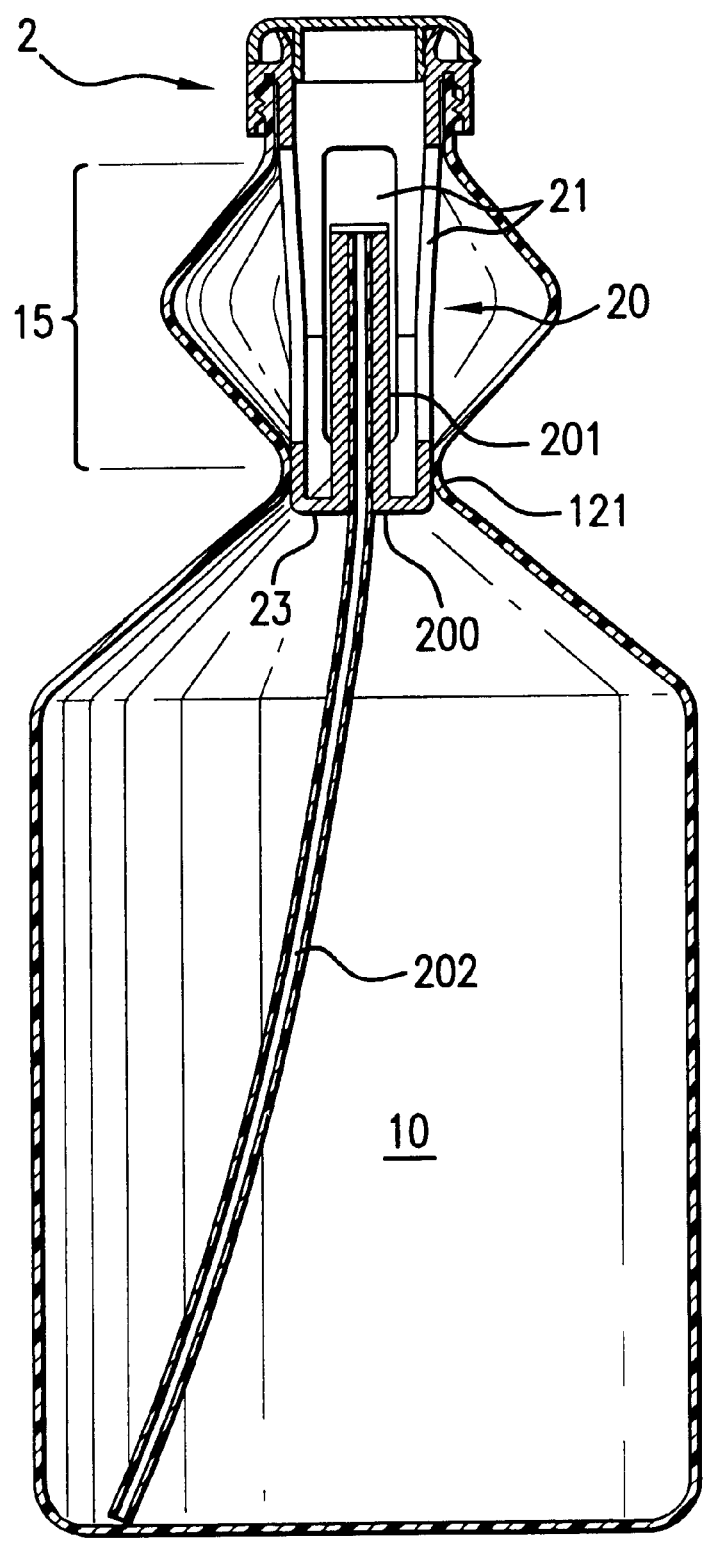
FIG. 10 is a vertical section showing one embodiment for liquid media, with a siphon metering system in the metering position.
Figure 11:
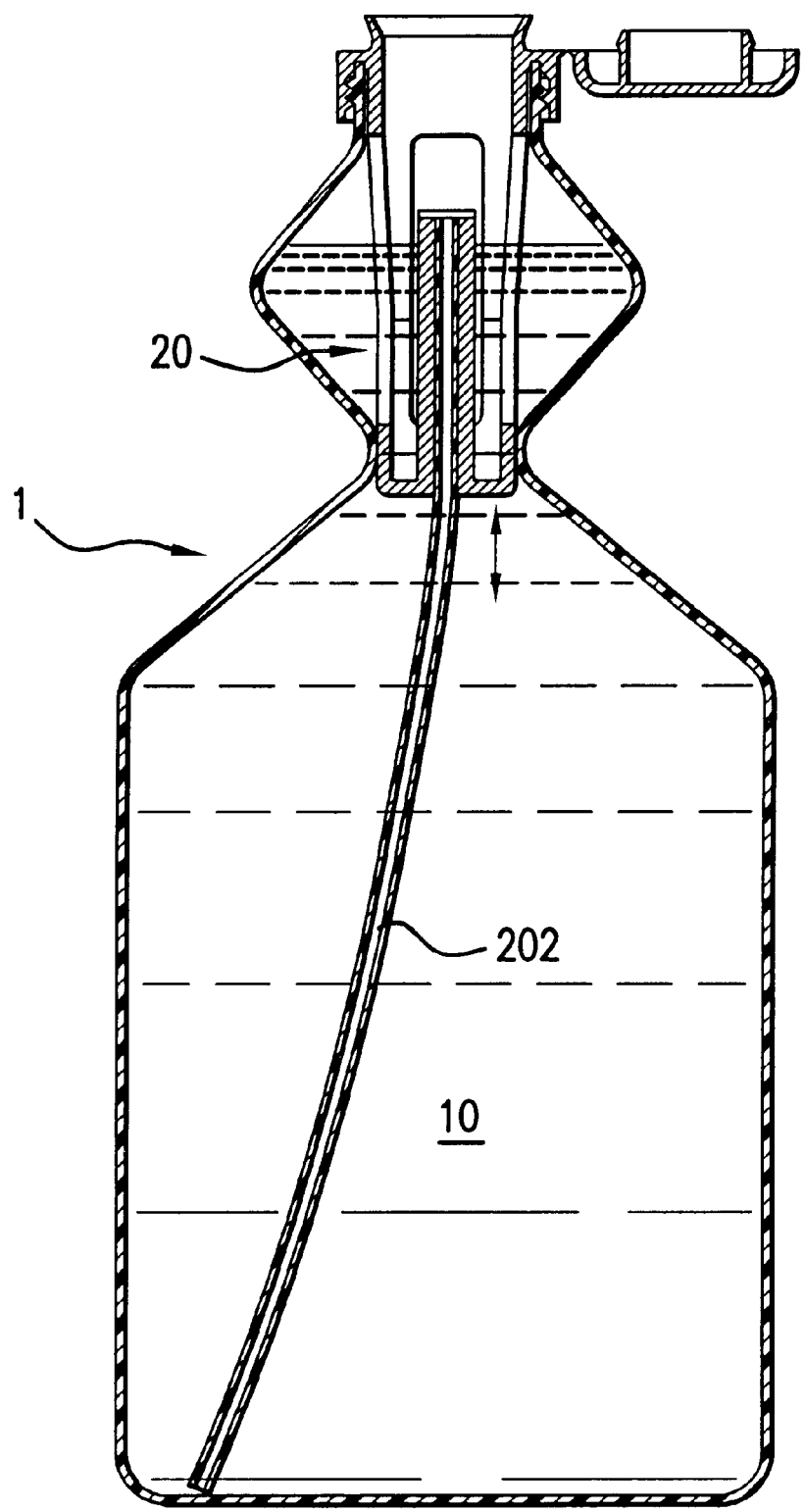
FIG. 11 shows the metering element of FIG. 10 but in the dispensing position.

FIGS. 10 and 11 show a siphon-like solution. The variants described up to now show the axially compressible region used to fill a metering quantity, but the axially compressed region permits the change, in particular the reduction of the metering quantity. The variable space 17 is also used for achieving a communicating connection between the metering element 20 and the storage space 10, however it serves for setting the metering quantity.

The metering element 20 has in the base 23 an inlet 200 to which there connects an upwardly extending ascending tube 201. In the ascending tube 201 is held a supply tubing 202 which extends from the upper end of the ascending tube 201 up to the base of the container 1.

There may be any height of the ascending tube 201. The lateral longitudinal openings 21 extend away practically over the entire length of the peg-like metering element so that the fluid medium to be metered also gets into the variable space 17. The variable space 17 serves also as a metering chamber and may have level markings.

With pressure on the storage space 10 of the plastic container 1, medium flows via the supply tubing 202 and the ascending tube 201 into the metering element 20 and the variable space 17. If the metered quantity exceeds the ascending tube 201 then it flows back again by itself or is even actively suctioned back since pressure no longer bears on the storage space 10. With this the metering element and the space 17 are filled up to the upper limit of the ascending tube 201.

By way of pressure on the closed closure 2 the longitudinal openings 21 may be brought into communicating connection with the storage space 10 below the constriction 121 and a corresponding desired quantity may flow back. Thereafter the closure 2 may be opened and the desired quantity may be poured out.

One could manufacture the plastic container transparently. Applications of such systems are with mouthwash, fabric softener liquids or with certain foodstuffs or drinks which are to be diluted.

What is claimed is:

1. In a plastic container with a storage space (10) which via a shoulder section (11) merges into a container neck (12), wherein the container neck (12) in a pour-out region (16) has fastening means for the indirect or direct fastening of a closure, wherein the container neck (12) between the pour-out region (16) and the shoulder section (11) has as a sealing region (14) a constriction (121) which connects to the shoulder section (11), the container neck is configured as a metering space (17) between the pour-out region (16) and the sealing region, on the pour-out region (16) there is fastened a metering element (20) with a cylindrical section (24) which from a pour-out passes through the metering space (17), and the metering element (20) with the cylindrical section (24) passes through the sealing region (14), the improvement comprising: the metering space (17) configured as an axially compressible space for metering when pressed together, and the metering element (20) with the cylindrical section (24) immerses into the storage space (10) and simultaneously reduces the metering space (17) and increases an immersing depth into the storage space (10).

2. In the plastic container with the metering element (10) according to claim 1, wherein the constriction (121) is extended to form a guide region (122).

3. In the plastic container with the metering element (10) according to claim 1, wherein in the constriction (121) there is applied a guide part (31) acting as a guide region.

4. In the plastic container with the metering element (10) according to claim 1, wherein the axially compressible region (15) is formed by at least one annular fold (123) acting as a bellows.

5. In the plastic container with the metering element (10) according to claim 1, wherein the metering element (20) is actively connected to the pour-out region (16) and has a lower cylindrical section (24) which is displaceably held in one of the constriction (121), a guide region and a guide part (31) and brings the storage space (10) into one of communicating connection and blocking connection with respect to an inner space (20') of the metering element (10).

6. In the plastic container with the metering element (10) according to claim 5, wherein the inner space (20') of the metering element (20) is formed by the cylindrical section (24) and a connected conically extending section (25), and walls at least of the cylindrical section (24) have longitudinal openings (21,29).

7. In the plastic container with the metering element (10) according to claim 5, wherein the metering element (10) has an outer thread (5) for attaching a closure (2,6).

8. In the plastic container with the metering element (10) according to claim 5, wherein the metering element (10) is one piece with a pivoting hinge closure (2).

9. In the plastic container with the metering element (10) according to claim 5, wherein the metering element (20) comprises a closed base (23).

\* \* \* \* \*